United States Patent [19]
Zook

[11] Patent Number: 4,842,931
[45] Date of Patent: Jun. 27, 1989

[54] AFFIXABLE PADDING MATERIAL USING GELATINOUS VISCOELASTIC POLYMER

[76] Inventor: Gerald P. Zook, 1860 Friendly, Eugene, Oreg. 97405

[21] Appl. No.: 221,213

[22] Filed: Jul. 19, 1988

[51] Int. Cl.[4] ............................................... C09J 7/02
[52] U.S. Cl. ..................................... 428/354; 428/230; 428/241; 428/283; 428/284; 428/343; 428/355; 428/224
[58] Field of Search ............... 428/224, 230, 231, 241, 428/284, 343, 354, 355, 402, 283

[56] References Cited

U.S. PATENT DOCUMENTS

| | | | |
|---|---|---|---|
| 4,369,284 | 1/1983 | Chen | 524/505 |
| 4,613,537 | 9/1986 | Hrupper | 428/230 |
| 4,696,854 | 9/1987 | Ethier | 428/354 |
| 4,766,028 | 8/1988 | Rich | 428/285 |

Primary Examiner—James J. Bell
Attorney, Agent, or Firm—William D. Haffner

[57] ABSTRACT

An affixable pad for corns, calluses, bunions, and the like, made from a soft viscoelastic gel material. Preferably, the gel contains a high percentage of plasticizing oil such as Mineral Oil U.S.P. The gel is impregnated onto an elastic fabric, such as Spandex, which allows the gel to flow around a lesion and equalize pressure in a superior manner.

14 Claims, 3 Drawing Sheets

SECTION A-A

SECTION

SECTION

AFFIXABLE PADDING MATERIAL USING GELATINOUS VISCOELASTIC POLYMER

BACKGROUND OF THE INVENTION

1. Field of the Invention

The invention relates in general to padding materials and more specifically to gelatinous viscoelastic padding materials impregnated onto an adhesive-backed fabric for fixation to human tissue.

2. Description of the Prior Art

Historically, articles of many different compositions have been utilized in medicine and podiatry to protect and pad human tissue. Most of the articles have been made of soft, compressible materials such as lamb's wool, felt, and foam rubber. One example of such padding is an adhesive-backed felt fabric known by the generic name moleskin. In order to use moleskin in an area of limited space such as inside the narrow confines of a shoe, the felt layer must be relatively thin. Using a thin layer of felt limits the moleskin's ability to protect human tissue from pressure and shear forces generated by walking. Another commonly-employed padding material is foam rubber. Again, in the narrow confines of a shoe a relatively thin layer of foam rubber must be employed or it will be compressed to the point where it becomes hard or "bottoms out" and loses its ability to distribute pressure around an uneven surface. Each material's ability to dissipate pressure and shear forces is diminished when it is used in thin layers.

In recent years, a new class of materials has been developed which shows great promise as padding. These materials are the soft, gelatinous viscoelastic polymers. Gelatinous viscoelastic polymers have the ability to distribute pressure around an uneven surface in a manner similar to hydraulic fluid in a brake or pump. Because of their elastic, resilient nature, viscoelastic materials have the ability to return to their original shape after removal of a deforming force. These characteristics of viscoelastic gels lead to superior results when they are used as padding. For example, when a viscoelastic pad is placed between a bony prominence of a bunion and the relatively unyielding material of a shoe, the pad conforms to the shape of the bony prominence and thus distributes pressure and shear forces generated by the shoe in a manner far superior to conventional materials. When the deforming forces are removed, i.e., the shoe is removed, the viscoelastic gel returns to its original conformation.

Since most gelatinous viscoelastic polymers will not bond directly to an adhesive because they contain plasticizing oils or because of the intrinsic nature of the polymer itself, it has not been possible to affix pads fashioned from these polymers directly to another surface by means of a pressure-sensitive adhesive. Heretofore, these pads were simply laid on the structure to be protected and held in place by body weight, gravity, or opposing body surfaces. In some cases, elaborate taping, bandaging, or enclosure techniques were employed. The present invention solves this problem by impregnating the gelatinous viscoelastic padding onto a layer of fabric and coating a portiton of the fabric with a pressure-sensitive adhesive.

SUMMARY OF THE INVENTION

Accordingly, it is an object of the present invention to provide padding substantially free of one or more of the disadvantages of prior art padding.

Specifically, it is an object of the present invention to provide a gelatinous viscoelastic pad that has means for affixing it to a specific site without subsequent migration of the padding material.

It is a further object to provide a gelatinous viscoelastic padding material that can be cut to the precise dimensions required with ordinary scissors.

It is another object to provide a gelatinous viscoelastic padding material that is able to relieve the pain of corns, blisters, and bunions, and the like, when employed in the relatively nonbulky layers required in the narrow confines of a shoe.

The invention consists of a layer or layers of fabric impregnated with a layer of gelatinous viscoelastic polymer. A pressure sensitive adhesive is applied to a surface or surfaces of the fabric not impregnated with the gel to provide an affixing means. Thus, an improved, easily-affixable gelatinous viscoelastic padding material is provided.

The subject matter of the present invention is particularly pointed out and distinctly claimed in the following description. The invention, however, both as to organization and method of use together with further advantages and objects thereof may best be understood by reference to the following description taken in conjunction with the accompanying drawings wherein like reference numerals refer to like elements. It is to be understood that these embodiments are not intended to be exhausting nor limiting of the invention but are for the purpose of illustration in order that other skilled in the art may fully understand the invention and principles thereof and the manner of applying it in a particular use so that they may modify it in various ways, each as may best be suited to the conditions of the particular use.

DESCRIPTION OF THE PREFERRED EMBODIMENT

In order to facilitate a better understanding of the invention, its essential elements will be discussed in detail and clinically significant implications will be pointed out when appropriate.

Figure 1:
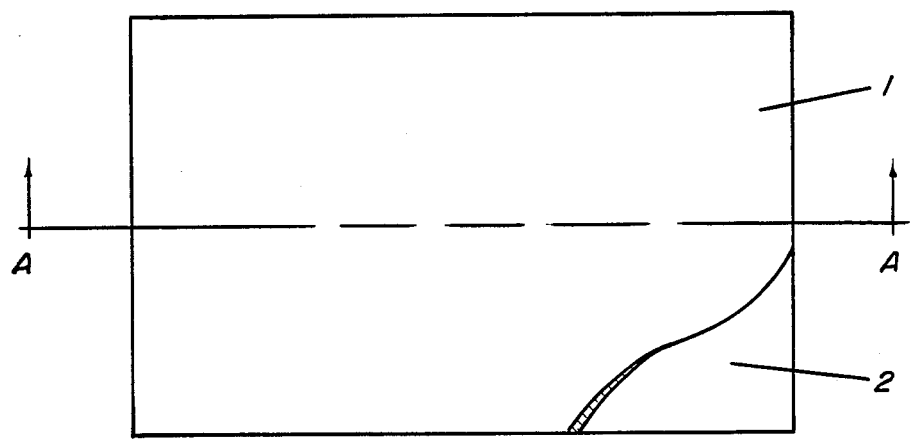
FIG. 1 is a plan view of one embodiment of the present invention illustrating fabric 2 which is partially covered with a layer of gelatinous viscoelastic polymer 1.
Figure 2:
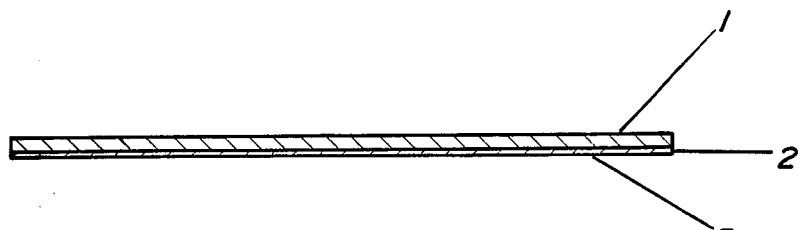
FIG. 2 is a sectional view taken through line A—A' of the embodiment of FIG. 1. Surface 3 is the bottom surface of fabric 2 which is coated with a pressure-sensitive adhesive.

Referring to FIG. 1 and FIG. 2, one embodiment of the invention is shown wherein a sheet of fabric 2 is impregnated with a layer of gelatinous viscoelastic polymer 1 on one surface and coated with a layer of pressure-sensitive adhesive on opposite surface 3. Gelatinous viscoelastic polymer 1 may be directly impregnated on fabric 2 during the synthesis or preparation of the polymer or, in the case of thermoplastic gelatinous viscoelastic polymers, impregnated into fabric 2 by heating polymer 1 above its melting point, pouring the molten polymer 1 onto fabric 2, and allowing it to cool. Other methods for affixing polymer 1 to fabric 2 include, but are not limited to: using an adhesive, applying heat, sufficient to liquify the polymer, to the surface of fabric 2 opposite the layer of polymer 1, sewing, stapling, or using Velcro fasteners. The layer of polymer 1 should be of sufficient thickness to be affective as a pressure and shear force dissipator and yet be thin enough to fit into enclosed structures such as the confines of a shoe. For most purposes, a layer of polymer 1 from approximately 0.1 millimeter to 10 millimeters thick is sufficient. This, however, does not preclude areas of zero thickness where required, such as for an aperture in a corn or bunion pad. The layer of gelatinous viscoelastic polymer 1 may be of uniform thickness or vary in thickness across its diameter when such variations are advantageous for optimum padding around an orthopedic deformity such as a bunion, hammertoe, heel spur, or corn; or when used as a component in particular items such as shoes, insoles, arch supports, heel cups, crest pads, padded socks, ankle wraps or braces, or pads for corns and bunions.

The layer of polymer 1 may be confluent over the entire surface of fabric 1 or comprise a discrete circumscribed structure upon the surface of fabric 1 in the shape of a corn or bunion pad.

The layer of gelatinous viscoelastic polymer 1 may be dusted with different materials to eliminate tackiness and reduce friction. These materials include talc, baby powder, and corn starch. Polymer 1 may also be dusted with a medicinal agent such as an antifungal powder or an antiperspirant powder. When a gelatinous vicoelastic polymer that contains a plasticizing oil is used in the present invention, oil solubable medicinal agents such as antifungal agents, keratolytic agents, or antiperspirants may be added to the plasticizing oil. Alternatively, a plasticizing oil, such as Mineral Oil U.S.P., with intrinsic medicinal, lubricating, or emollient properties may be utilized.

Figure 3:
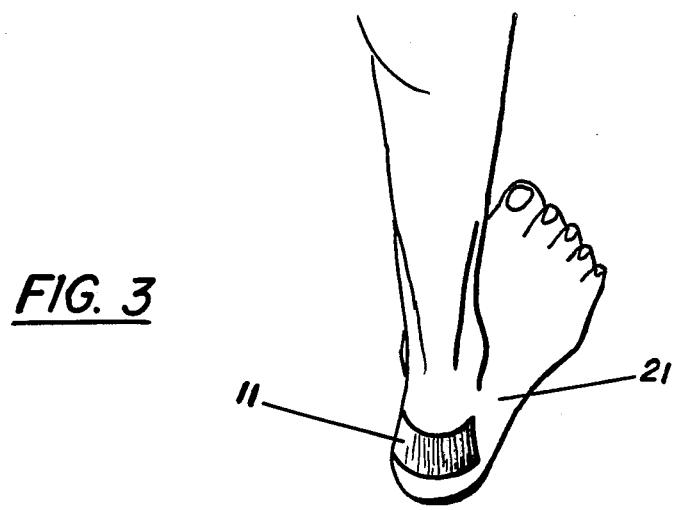
FIG. 3 illustrates pad 11, fashioned from the embodiment illustrated in FIG. 1 and FIG. 2 affixed to the posterior aspect of foot 21.

Referring again to FIG. 1, an uncoated portion of fabric 2 is shown. Fabric 2 can be either natural or man-made material. Fabric 2 should be either porous or "wettable" by gelatinous viscoelastic polymer 1 to insure good bonding of the polymer during the impregnation process. Fabric 1 should be sufficiently thin so as to facilitate utilization in narrow confines and sufficiently soft and flexible so as not to nullify the cushioning and pressure dissipating properties of gelatinous viscoelastic polymer 1. A flexible, elastic fabric such as Spandex is ideally suited to this purpose. Other materials such as leather or plastic sheeting also may satisfy the requirements for the fabric layer. Whatever material is utilized for fabric 2, it should be cuttable with readily available means such as ordinary scissors in order to fashion pads for a particular purpose as illustrated in FIG. 3 where such a pad 11 has been fashioned and affixed to the posterior aspect of foot 21. Referring to FIG. 2 again, the layer of pressure-sensitive adhesive is shown coating surface 3 of fabric 2 which is opposite the layer of gelatinous viscoelastic polymer 1.

Figure 4:
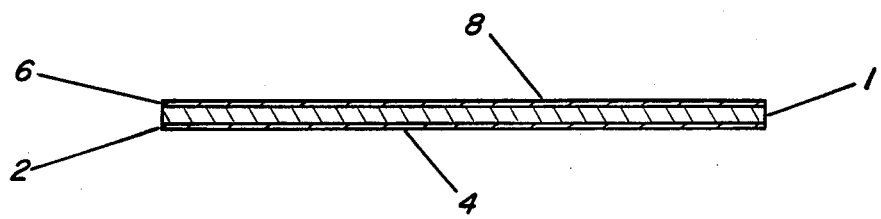
FIG. 4 is a sectional view of an alternative embodiment of the present invention wherein gelatinous viscoelastic polymer 1 lies between two layers of fabric 2 and 6. Surface 4 and/or 8 of the fabric may be coated with pressure-sensitive adhesive.

FIG. 4 shows an alternate embodiment of the present invention wherein a layer of gelatinous viscoelastic polymer 1 is sandwiched between two layers of fabric 2 and 6. Fabric 2 and 6 and gelatinous viscoelastic polymer 1 have essentially the same qualities and characteristics as the corresponding elements described in reference to the embodiment depicted in FIG. 1, FIG. 2, and FIG. 3. In the present embodiment, fabric surfaces 4 and 8 may both be coated with a pressure-sensitive adhesive, one or the other of the surfaces may be coated with a pressure-sensitive adhesive, or neither of the surfaces may be coated with a pressure-sensitive adhesive.

Figure 5:
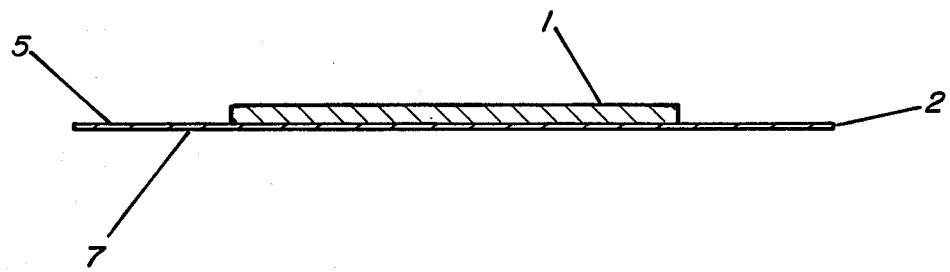
FIG. 5 is a section view of still another embodiment of the present invention wherein one surface of fabric 2 is partially covered by a circumscribed layer of gelatinous viscoelastic polymer 1 and the remainder of the same surface is coated with pressure-sensitive adhesive 5. The surface of fabric 2 opposite gelatinous viscoelastic polymer 1 is unaltered fabric 7.

Referring now to FIG. 5, still another embodiment of the present invention is illustrated. In this embodiment, a portion of fabric 2 is impregnated with a circumscribed layer of gelatinous viscoelastic polymer 1. The portion of fabric 2 on the same surface as polymer 1 but not covered by polymer 1 is coated with a pressure-sensitive adhesive 5. Surface 7 would not be coated with pressure-sensitive adhesive for most purposes, but could be if the intended use made this desirable. In this embodiment, the gel comes into direct contact with the lesion being padded when the article is applied. When utilizing a gel such as that described by Chen in U.S. Pat. No. 4,369,284, which incorporates large quantities of plasticizing oil such as Mineral Oil U.S.P., this protective pad becomes a medicating pad. Mineral oil has been used for over a century as a softening and lubricating agent for cutaneous lesions such as corns and calluses. It has also been used as drug solvent or vehicle for topically applied medication. Medications such as antifungals can be incorporated into the oil fraction of the gel to provide a novel padding and medicating device. Additionally, the gel can be dusted with talc or corn starch to reduce its tackiness. Medicinal powders, such as antifungal powders, can be used for this purpose and extend the range of possibilities when contemplating the medicating function of the present invention. Using flexible and highly elastic fabric such as Spandex results in some novel and unexpected results in this embodiment. Since the viscoelastic gel is impregnated onto the fabric, the gel is prevented from migrating when worn in an environment of constantly alternating pressure and shear forces such as that found in a shoe during walking. In this embodiment, the viscoelastic gel responds to these forces by flowing into a new configuration in an attempt to equalize pressure throughout the gel. An elastic fabric such as Spandex is capable of stretching to accommodate this flow and, thus facilitate equalization of pressure throughout the gel pad. Viscoelastic gel has been referred to as "synthetic fat" when it is used in medicine to alleviate dangerous pressure points. Following this analogy, using an elastic fabric such as Spandex to cover and fixate the viscoelastic gel creates a device that duplicates skin and subcutaneous fat in the manner in which they work together to dissipate pressure and shear forces applied to human and animal tissue. Skin, like Spandex in this embodiment, is highly elastic and stretches to equalize the pressure throughout the fatty soft tissue that nature provides as padding. Thus, this embodiment represents a novel and superior soft tissue supplement for human tissue.

While there has been shown and described the preferred embodiments of the present invention, it will be apparent to those skilled in the art that many changes and modifications may be made without departing from the invention in its broader aspects. Therefore the appended claims are intended to cover all such modifications and changes that fall within the true spirit and scope of the invention.

I claim as my invention:

1. An affixable soft tissue padding device comprising:
   (a) a sheet of flexible fabric;
   (b) a layer of gelatinous viscoelastic padding material impregnated onto one surface of said sheet of flexible fabric; and
   (c) a layer of pressure-sensitive adhesive coating the surface of said sheet of flexible fabric opposite the surface impregnated with said layer of gelatinous viscoelastic padding material.

2. The affixable soft tissue padding device of claim 1 wherein said layer of gelatinous viscoelastic padding material is of uniform thickness.

3. The affixable soft tissue padding device of claim 1 wherein said layer of gelatinous viscoelastic padding material varies in thickness.

4. The affixable soft tissue padding device of claim 1 wherein said layer of gelatinous viscoelastic padding material is confluent over the entire surface of the sheet of flexible fabric.

5. The affixable soft tissue padding device of claim 1 wherein said layer of gelatinous viscoelastic padding material is limited to a circumscribed area on the surface of said sheet of flexible fabric.

6. The affixable soft tissue padding device of claim 1 wherein said sheet of flexible fabric is elastic in nature.

7. An affixable soft tissue padding device comprising:
   (a) a sheet of flexible fabric;
   (b) a circumscribed layer of gelatinous viscoelastic padding material impregnated on a portion of one surface of said sheet of flexible fabric; and
   (c) a layer of pressure-sensitive adhesive coating the remainder of same surface of said sheet of flexible fabric as said gelatinous viscoelastic padding material.

8. The affixable soft tissue padding device of claim 7 wherein said layer of circumscribed gelatinous padding material is of uniform thickness.

9. The affixable soft tissue padding device of claim 7 wherein said layer of circumscribed gelatinous padding material varies in thickness.

10. The affixable soft tissue padding device of claim 7 wherein said sheet of flexible fabric is elastic in nature.

11. The affixable soft tissue padding device of claim 7 wherein said circumscribed layer of gelatinous viscoelastic padding material is dusted with one or more of the following powders: talc, corn starch, antifungal powder, or antiperspirant powder.

12. The affixable soft tissue padding device of claim 7 wherein said layer of gelatinous viscoelastic padding material contains more than 50 percent plasticizing oil.

13. The affixable soft tissue padding device of claim 12 wherein said plasticizing oil is Mineral Oil U.S.P.

14. The affixable soft tissue padding device of claim 12 wherein said plasticizing oil contains a dissolved medicinal agent from one or more of the following categories: antifungal agents, keratolytic agents, or antiperspirant agents.

* * * * *